United States Patent
Kameyama et al.

(10) Patent No.: US 11,276,865 B2
(45) Date of Patent: Mar. 15, 2022

(54) CARBON CATALYST, AND ELECTRODE AND BATTERY CONTAINING SAME

(71) Applicants: NISSHINBO HOLDINGS INC., Tokyo (JP); NATIONAL UNIVERSITY CORPORATION GUNMA UNIVERSITY, Maebashi (JP)

(72) Inventors: Rieko Kameyama, Sano (JP); Yasuo Imashiro, Chiba (JP); Jun-ichi Ozaki, Kiryu (JP); Takafumi Ishii, Kiryu (JP)

(73) Assignees: NISSHINBO HOLDINGS INC., Tokyo (JP); NATIONAL UNIVERSITY CORPORATION GUNMA UNIVERSITY, Maebashi (JP)

( * ) Notice: Subject to any disclaimer, the term of this patent is extended or adjusted under 35 U.S.C. 154(b) by 145 days.

(21) Appl. No.: 16/464,996

(22) PCT Filed: Nov. 30, 2017

(86) PCT No.: PCT/JP2017/042951
§ 371 (c)(1),
(2) Date: May 29, 2019

(87) PCT Pub. No.: WO2018/105472
PCT Pub. Date: Jun. 14, 2018

(65) Prior Publication Data
US 2019/0296365 A1   Sep. 26, 2019

(30) Foreign Application Priority Data
Dec. 6, 2016 (JP) .............................. JP2016-236828

(51) Int. Cl.
*H01M 4/90* (2006.01)
*B01J 21/18* (2006.01)
(Continued)

(52) U.S. Cl.
CPC ............... *H01M 4/90* (2013.01); *B01J 21/18* (2013.01); *B01J 27/185* (2013.01); *H01M 4/9008* (2013.01); *B01J 31/0257* (2013.01)

(58) Field of Classification Search
CPC ........ H01M 4/90; H01M 4/9008; B01J 21/18; B01J 21/185; B01J 31/0257
See application file for complete search history.

(56) References Cited

U.S. PATENT DOCUMENTS

| 5,294,498 A | 3/1994 | Omaru et al. |
| 2013/0217567 A1 | 8/2013 | Kishimoto et al. |
| (Continued) | | |

FOREIGN PATENT DOCUMENTS

| CN | 103221129 A | 7/2013 |
| CN | 103974900 A | 8/2014 |
| (Continued) | | |

OTHER PUBLICATIONS

Singh et al.; "Fe—P: A New Class of Electroactive Catalyst for Oxygen Reduction Reaction;" Journal of the American Chemical Society; 2015; pp. 3165-3168; vol. 137, No. 9.
(Continued)

*Primary Examiner* — Ula C Ruddock
*Assistant Examiner* — Armindo Carvalho, Jr.
(74) *Attorney, Agent, or Firm* — Oliff PLC (57) ABSTRACT

A carbon catalyst has improved catalytic activity, and an electrode and a battery include the carbon catalyst. A carbon catalyst includes a metal and phosphorus atoms, wherein a ratio of a concentration (atomic %) of the phosphorus atoms exhibiting a peak having a peak top within a range of 132.5±0.3 eV and having a full width at half maximum of 2.0±0.5 eV, which is obtained by peak separation of a phosphorus atom P2p peak, with respect to a concentration
(Continued)

(atomic %) of carbon atoms in X-ray photoelectron spectroscopic measurement is 0.0005 or more.

10 Claims, 4 Drawing Sheets

(51) Int. Cl.
  *B01J 27/185* (2006.01)
  *B01J 31/02* (2006.01)

(56) References Cited

U.S. PATENT DOCUMENTS

| | | |
|---|---|---|
| 2013/0255763 A1 | 10/2013 | Naito et al. |
| 2013/0260286 A1 | 10/2013 | Naito et al. |
| 2014/0353144 A1 | 12/2014 | Nakanishi et al. |
| 2017/0194653 A1 | 7/2017 | Imashiro et al. |

FOREIGN PATENT DOCUMENTS

| | | |
|---|---|---|
| JP | H05-74457 A | 3/1993 |
| JP | H10-40913 A | 2/1998 |
| JP | 2013-208597 A | 10/2013 |
| JP | 2013-209261 A | 10/2013 |
| KR | 20140022596 A | 2/2014 |
| WO | 2016/088716 A1 | 6/2016 |

OTHER PUBLICATIONS

Jun. 23, 2020 Extended Search Report issued in European Patent Application No. 17878288.4.

Jun. 23, 2020 Search Report issued in European Patent Application No. 17878288.4.

Qiao et al.; "Nitrogen, phosphorus and iron doped carbon nanospheres with high surface area and hierarchical porous structure for oxygen reduction;" Journal of Power Sources; 2015; pp. 253-260; vol. 288.

Mar. 6, 2018 Search Report issued in International Application No. PCT/JP2017/042951.

| | XPS | | | | | | | XRD | | CATALYTIC ACTIVITY | |
|---|---|---|---|---|---|---|---|---|---|---|---|
| | C (ATOMIC%) | P (ATOMIC%) | METAL (ATOMIC%) | N/C (-) | P/C (-) | P132.5/C (-) | P132.5/Ptotal (-) | Fnarrow RATIO (%) | Fbroad RATIO (%) | CURRENT DENSITY @ 0.5 (mA/cm²) | PERFORMANCE RETENTION RATIO (%) |
| EXAMPLE 1 | 82.35 | 1.26 | 0.69 | 0.0220 | 0.0150 | 0.0057 | 0.3741 | 98.13 | 1.87 | -2.28 | 91.6 |
| EXAMPLE 2 | 81.12 | 0.59 | 0.71 | 0.0160 | 0.0070 | 0.0036 | 0.5529 | 94.44 | 5.56 | -1.79 | 86.3 |
| EXAMPLE 3 | 82.04 | 0.64 | 0.65 | 0.0160 | 0.0080 | 0.0026 | 0.3920 | 97.86 | 2.14 | -1.98 | 84.8 |
| EXAMPLE 4 | 82.50 | 1.29 | 0.75 | 0.0150 | 0.0150 | 0.0075 | 0.5160 | 98.39 | 1.61 | -2.60 | 92.1 |
| EXAMPLE 5 | 79.01 | 0.79 | 0.41 | 0.0080 | 0.0100 | 0.0073 | 0.7196 | 99.68 | 0.32 | -2.50 | 92.5 |
| EXAMPLE 6 | 83.60 | 1.17 | 0.93 | 0.0280 | 0.0139 | 0.0095 | 0.8100 | 94.50 | 5.50 | -2.28 | 89.0 |
| EXAMPLE 7 | 82.34 | 0.85 | 0.61 | 0.0157 | 0.0079 | 0.0024 | 0.3025 | 96.00 | 4.00 | -1.60 | 84.3 |
| EXAMPLE 8 | 82.36 | 2.00 | 0.28 | 0.0248 | 0.0243 | 0.0116 | 0.4799 | 95.80 | 4.20 | -2.28 | 89.8 |
| EXAMPLE 9 | 83.60 | 0.45 | 0.60 | 0.0280 | 0.0051 | 0.0038 | 0.7500 | 96.88 | 3.12 | -2.06 | 87.0 |
| COMPARATIVE EXAMPLE 1 | 84.72 | 0.11 | 0.85 | 0.0380 | 0.0010 | 0.0004 | 0.2900 | 72.83 | 27.17 | -0.92 | 82.0 |
| COMPARATIVE EXAMPLE 2 | 79.80 | 5.37 | 0.15 | 0.1014 | 0.0682 | 0.0001 | 0.0010 | 100.00 | 0.00 | -0.05 | 0.0 |

CARBON CATALYST, AND ELECTRODE AND BATTERY CONTAINING SAME

TECHNICAL FIELD

The present invention relates to a carbon catalyst, and an electrode and a battery including the carbon catalyst.

BACKGROUND ART

In Patent Literature 1, there is described an oxygen reduction catalyst, including a stack of single-layer graphene and a phosphorous compound, and having such a graphene skeleton that carbon atoms of the graphene are partially replaced by nitrogen atoms, in which the phosphorus compound has a peak of a phosphorus 2p orbital of from 133.0 eV to 134.5 eV in an X-ray photoelectron spectrum, or a peak of a phosphorus 2p orbital of the phosphorus compound is shifted by from 1.0 eV to 2.5 eV toward a high-energy side from a peak of a phosphorus 2p orbital of tetra-n-butylphosphonium bromide in an X-ray photoelectron spectrum. It is also described that the oxygen reduction catalyst further contains iron or cobalt, and that the oxygen reduction catalyst further contains platinum.

CITATION LIST

Patent Literature

[PTL 1] JP 2013-208597 A

SUMMARY OF INVENTION

Technical Problem

Hitherto, however, it has not been clear in which state phosphorus atoms contribute to the improvement of catalytic activity in a carbon catalyst.

The present invention has been made in view of the above-mentioned problem, and one of the objects of the present invention is to provide a carbon catalyst having improved catalytic activity, and an electrode and a battery including the carbon catalyst.

Solution to Problem

According to one embodiment of the present invention for solving the above-mentioned problem, there is provided a carbon catalyst including a metal and phosphorus atoms, wherein the carbon catalyst has a ratio of a concentration (atomic %) of the phosphorus atoms with respect to a concentration (atomic %) of carbon atoms in X-ray photoelectron spectroscopic measurement of 0.0005 or more, the phosphorus atoms exhibiting a peak having a peak top within a range of 132.5±0.3 eV and having a full width at half maximum of 2.0±0.5 eV, which is obtained by peak separation of a phosphorus atom P2p peak. According to the embodiment of the present invention, a carbon catalyst having improved catalytic activity is provided.

In addition, the carbon catalyst may have a ratio of an area of the following peak (2) with respect to a total area of the following five peaks (1) to (5) in the X-ray photoelectron spectroscopic measurement of 0.3000 or more, the five peaks being obtained by the peak separation of the phosphorus atom P2p peak: (1) a peak having a peak top within a range of 130.0±0.3 eV and having a full width at half maximum of 2.0±0.5 eV; (2) a peak having a peak top within a range of 132.5±0.3 eV and having a full width at half maximum of 2.0±0.5 eV; (3) a peak having a peak top within a range of 133.2±0.3 eV and having a full width at half maximum of 2.0±0.5 eV; (4) a peak having a peak top within a range of 133.9±0.3 eV and having a full width at half maximum of 2.0±0.5 eV; and (5) a peak having a peak top within a range of 135.6±0.4 eV and having a full width at half maximum of 2.0±0.5 eV.

In addition, the carbon catalyst may have a carbon structure in which area ratios (%) of the following two peaks $f_{broad}$ and $f_{narrow}$ obtained by separating a peak in a vicinity of a diffraction angle (2θ) of 26° in an X-ray diffraction pattern in powder X-ray diffraction measurement satisfy the following conditions (a) and (b): (a) a peak $f_{broad}$ having a peak top within a range of a diffraction angle (2θ) of 23.5°±3.5° and having a full width at half maximum of 10.0°±5.0°: 73.0% or more and less than 100.0%; and (b) a peak $f_{narrow}$ having a peak top within a range of a diffraction angle (2θ) of 26.5°±1.0° and having a full width at half maximum of 3.5°±3.0°: more than 0.0% and 27.0% or less.

According to one embodiment of the present invention for solving the above-mentioned problem, there is provided an electrode, including any one of the above-mentioned carbon catalysts. According to the embodiment of the present invention, an electrode having improved performance is provided.

According to one embodiment of the present invention for solving the above-mentioned problem, there is provided a battery, including the above-mentioned electrode. According to the embodiment of the present invention, a battery having improved performance is provided.

Advantageous Effects of Invention

According to the present invention, a carbon catalyst having improved catalytic activity, and an electrode and a battery including the carbon catalyst are provided.

DESCRIPTION OF EMBODIMENTS

Now, embodiments of the present invention will be described. The present invention is not limited to examples shown in these embodiments.

A carbon catalyst according to one embodiment of the present invention (hereinafter referred to as "catalyst of the present invention") includes a metal and phosphorus atoms, where the carbon catalyst has a ratio of a concentration (atomic %) of the phosphorus atoms with respect to a concentration (atomic %) of carbon atoms in X-ray photoelectron spectroscopic measurement of 0.0005 or more, where the phosphorus atoms exhibit a peak having a peak top within a range of 132.5±0.3 eV and having a full width at half maximum of 2.0±0.5 eV, which is obtained by peak separation of a phosphorus atom P2p peak.

That is, the catalyst of the present invention is a carbon catalyst containing a metal and phosphorus atoms. More specifically, the catalyst of the present invention is a carbonized material containing a metal and phosphorus atoms, which is obtained by carbonizing a raw material containing an organic substance, the metal, and a phosphorus compound as will be described later.

It is preferred that the metal contained in the catalyst of the present invention be a transition metal. In this embodiment, the transition metal is a metal belonging to Groups III to XII in the periodic table, and one or more kinds of the transition metals belonging to the fourth period of Groups III to XII in the periodic table are preferably used.

Specifically, the transition metal may be, for example, one or more kinds selected from a group consisting of scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), ruthenium (Ru), rhodium (Rh), palladium (Pd), lanthanoids (cerium (Ce) and others), and actinoids. The transition metal may be preferably one or more kinds selected from a group consisting of Sc, Ti, V, Cr, Mn, Fe, Co, Ni, Cu, and Zn, or one or more kinds selected from a group consisting of Fe, Cu, and Zn.

One of the characteristic features of the catalyst of the present invention is that a $P_{132.5}/C$ ratio is a predetermined threshold value or more, where the $P_{132.5}/C$ ratio is a ratio, which is obtained by the XPS measurement, of a concentration (atomic %) of particular phosphorus atoms exhibiting the above-mentioned peak (peak $P_{132.5}$) having a peak top within a range of 132.5±0.3 eV and having a full width at half maximum of 2.0±0.5 eV with respect to a concentration (atomic %) of carbon atoms.

That is, the inventors of the present invention have repeatedly conducted extensive investigations on technical means for improving the catalytic activity of a carbon catalyst containing a metal and phosphorus atoms. As a result, the inventors of the present invention have uniquely found that particular phosphorus atoms exhibiting the above-mentioned peak $P_{132.5}$ obtained by peak separation of a phosphorus atom P2p peak in an XPS spectrum contributes to the improvement of the catalytic activity of the carbon catalyst, to thereby achieve the present invention.

In the XPS spectrum, the P2p peak appears within a range of 133±3.3 eV. The P2p peak includes peaks of five kinds of phosphorus atoms having different oxidation states due to different binding manners to other atoms.

That is, the P2p peak can be separated into the following five peaks (1) to (5) by peak separation described later in detail in Examples: (1) a peak (peak $P_{130.0}$) having a peak top within a range of 130.0±0.3 eV and having a full width at half maximum of 2.0±0.5 eV; (2) a peak (peak $P_{132.5}$) having a peak top within a range of 132.5±0.3 eV and having a full width at half maximum of 2.0±0.5 eV; (3) a peak (peak $P_{133.2}$) having a peak top within a range of 133.2±0.3 eV and having a full width at half maximum of 2.0±0.5 eV; (4) a peak (peak $P_{133.9}$) having a peak top within a range of 133.9±0.3 eV and having a full width at half maximum of 2.0±0.5 eV; and (5) a peak (peak $P_{135.6}$) having a peak top within a range of 135.6±0.4 eV and having a full width at half maximum of 2.0±0.5 eV.

As a result, the inventors of the present invention have found that phosphorus atoms exhibiting a particular peak that is the above-mentioned peak $P_{132.5}$ among those five peaks contributes to the catalytic activity of the carbon catalyst containing a metal and phosphorus atoms.

As described above, the peak $P_{132.5}$ is specified as one of the above-mentioned five peaks obtained by peak separation of a phosphorus atom P2p peak in an XPS spectrum of the catalyst of the present invention.

The phosphorus atoms exhibiting the peak $P_{132.5}$ encompass, for example, phosphorus atoms bound to one or two oxygen atoms and also bound to one or two carbon atoms. More specifically, the phosphorus atoms exhibiting the peak $P_{132.5}$ encompass, for example, phosphorus atoms bound to two oxygen atoms and bound to two carbon atoms, and/or phosphorus atoms bound to two oxygen atoms and bound to one carbon atom.

On the other hand, the peak $P_{130.0}$ is a peak derived from elemental phosphorus atoms. The peak $P_{133.2}$ is a peak derived from phosphorus atoms of a phosphoric acid type. The peak $P_{133.9}$ is a peak derived from phosphorus atoms of the —O—PO$_3$ atomic group. The peak $P_{135.6}$ is a peak derived from phosphorus atoms of a diphosphorus pentoxide type.

In some cases, at least one of the four peaks other than the peak $P_{132.5}$ is not substantially detected as a result of performing peak separation for separating the P2p peak into the above-mentioned five peaks in the catalyst of the present invention.

There is no particular limitation on the $P_{132.5}/C$ ratio of the catalyst of the present invention as long as the $P_{132.5}/C$ ratio is 0.0005 or more, but for example, the $P_{132.5}/C$ ratio is preferably 0.0010 or more, more preferably 0.0020 or more. Further, when the $P_{132.5}/C$ ratio of the catalyst of the present invention is 0.0020 or more, the $P_{132.5}/C$ ratio is preferably 0.0040 or more, more preferably 0.0045 or more, still more preferably 0.0050 or more, particularly preferably 0.0055 or more.

There is no particular limitation on the upper limit value of the $P_{132.5}/C$ ratio of the catalyst of the present invention, but for example, the $P_{132.5}/C$ ratio may be 0.45 or less. As long as the $P_{132.5}/C$ ratio falls within any one of the above-mentioned ranges, the catalyst of the present invention has excellent catalytic activity.

The catalyst of the present invention may have a ratio of an area of the above-mentioned peak (2) (peak $P_{132.5}$) with respect to a total area of the above-mentioned five peaks (1) to (5) (peak $P_{130.0}$, peak $P_{132.5}$, peak $P_{133.2}$, peak $P_{133.9}$, and peak $P_{135.6}$), which are obtained by peak separation of a phosphorus atom P2p peak in the X-ray photoelectron spectroscopic measurement, of 0.3000 or more.

That is, in this case, the ratio ($P_{132.5}/P_{total}$ ratio) of the area of the peak $P_{132.5}$ (area $P_{132.5}$) with respect to the total of the area of the peak $P_{130.0}$, the area of the peak $P_{132.5}$, the area of the peak $_{133.2}$, the area of the peak $P_{133.9}$, and the area of the peak $P_{135.6}$ (area $P_{total}$) obtained by the XPS of the catalyst of the present invention is 0.3000 or more.

When at least one of the four peaks other than the peak $P_{132.5}$ is not substantially detected as a result of performing peak separation for separating the P2p peak into the above-mentioned five peaks, the $P_{132.5}/P_{total}$ ratio is calculated with the area of the peak that has not been detected being zero.

There is no particular limitation on the ratio of a concentration (atomic %) of phosphorus atoms with respect to a concentration (atomic %) of carbon atoms (hereinafter sometimes referred to as "P/C ratio") obtained by the XPS of the catalyst of the present invention. However, for example, the P/C ratio may be 0.0020 or more, preferably 0.0040 or more, more preferably 0.0085 or more, still more preferably 0.0090 or more, particularly preferably 0.0095 or more. There is no particular limitation on the upper limit value of the P/C value of the catalyst of the present invention, but for example, the P/C ratio may be 0.45 or less.

There is no particular limitation on the concentration (atomic %) of the phosphorus atoms obtained by the XPS of the catalyst of the present invention. However, for example, the concentration may be 0.20 atomic % or more, preferably 0.40 atomic % or more, more preferably 0.70 atomic % or more, particularly preferably 0.75 atomic % or more. There is no particular limitation on the upper limit value of the concentration (atomic %) of the phosphorus atoms of the catalyst of the present invention, but for example, the concentration (atomic %) of the phosphorus atom may be 30 (atomic %) or less.

The catalyst of the present invention may have a carbon structure in which area ratios. (%) of the following two peaks $f_{broad}$ and $f_{narrow}$ obtained by separating a peak in the vicinity of a diffraction angle (2θ) of 26° in an X-ray diffraction pattern in powder X-ray diffraction measurement satisfy the following conditions (a) and (b): (a) a peak $f_{broad}$ having a peak top within a range of a diffraction angle (2θ) of 23.5°±3.5° and having a full width at half maximum of 10.0°±5.0°: 73.0% or more and less than 100.0%; and (b) a peak $f_{narrow}$ having a peak top within a range of a diffraction angle (2θ) of 26.5°±1.0° and having a full width at half maximum of 3.5°±3.0°: more than 0.0% and 27.0% or less.

When the carbon catalyst has a laminate structure formed of a curved net surface that contributes to the catalytic activity thereof, a diffraction peak of a carbon (002) plane appears in the vicinity of a diffraction angle (2θ) of 26° (within a range of 23° or more and 27° or less) in an X-ray diffraction pattern. This peak includes the following two kinds of peaks: a graphite structure peak ($f_{narrow}$) derived from a (002) plane of a graphite structure that is a high-crystalline component, and a peak ($f_{broad}$) derived from a low-crystalline component.

In this respect, through peak separation of the X-ray diffraction pattern, the peak in the vicinity of 26° can be separated into two peaks $f_{broad}$ and $f_{narrow}$. Specifically, the peak separation is performed by the following procedures. First, an X-ray diffraction pattern obtained by powder X-ray diffraction measurement is subjected to intensity correction of a polarization factor, a Lorentz factor, and an atom scattering factor of carbon, and is also subjected to background correction in which a straight line connecting the vicinity of the diffraction angle of from 10° to 20° to the vicinity of the diffraction angle of from 30° to 40° is defined as a background, and the background is subtracted from each diffraction intensity after the intensity correction. Next, in the corrected X-ray diffraction pattern, the peak having a peak top in the vicinity of the diffraction angle 2θ of 26° is superimposed onto a Gaussian basic waveform to be approximated, to thereby optimize a peak intensity, a peak full width at half maximum, and a peak position, and each of two superimposed peaks included in the above-mentioned peak is subjected to curve fitting, to thereby perform peak separation. The curve fitting is performed so that a residual sum of squares becomes smallest. The residual square refers to a square of a residual error at each measured diffraction angle, and the residual sum of squares refers to a sum of residual squares. In addition, the residual error refers to a difference between the intensity of the peak having a peak top in the vicinity of the diffraction angle 2θ of 26° in the corrected X-ray diffraction pattern and the sum of intensities of the two separated peaks ($f_{broad}$ and $f_{narrow}$).

Through such peak separation, two peaks, that is, the peak $f_{broad}$ of a low-crystalline component and the peak $f_{narrow}$ of a high-crystalline component, are obtained. The peak $f_{broad}$ has a peak top within a range of a diffraction angle of 23.5°±3.5° and has a full width at half maximum of 10.0°±5.0°. The peak $f_{narrow}$ has a peak top within a range of a diffraction angle of 26.5°±1.0° and has a full width at half maximum of 3.5°±3.0°. The diffraction angle of the peak $f_{narrow}$ is larger than that of the peak $f_{broad}$.

The two peaks of the catalyst of the present invention may satisfy the following conditions (a) and (b): (a) $f_{broad}$: 75.0% or more and 99.9% or less; and (b) $f_{narrow}$: 0.1% or more and 25.0% or less.

The two peaks of the catalyst of the present invention may satisfy the following conditions (a) and (b): (a) $f_{broad}$: 80.0% or more and 99.9% or less; and (b) $f_{narrow}$: 0.1% or more and 20.0% or less.

The two peaks of the catalyst of the present invention may satisfy the following conditions (a) and (b): (a) $f_{broad}$: 85.0% or more and 99.9% or less; and (b) $f_{narrow}$: 0.1% or more and 15.0% or less.

The two peaks of the catalyst of the present invention may satisfy the following conditions (a) and (b): (a) $f_{broad}$: 90.0% or more and 99.9% or less; and (b) $f_{narrow}$: 0.1% or more and 10.0% or less.

The lower limit value within each range of the above-mentioned condition (b) is not limited to 0.1%. For example, each range of the condition (b) may be 0.2% or more, and each range of the condition (a) may be 99.8% or less.

The fact that the two peaks of the catalyst of the present invention satisfy the conditions (a) and (b), that is, the fact that the carbon structure of the catalyst of the present invention contains the low-crystalline component satisfying the condition (a) and the high-crystalline component satisfying the condition (b), effectively contributes to the catalytic activity and/or durability of the catalyst of the present invention.

The catalyst of the present invention has catalytic activity. Specifically, the catalyst of the present invention has, for example, oxygen reduction activity. In this case, the catalyst of the present invention effectively catalyzes an oxygen reduction reaction, for example, in an electrode for a fuel cell or an electrode for an air cell.

The oxygen reduction activity of the catalyst of the present invention is evaluated, for example, based on a current density $i_{0.5}$ (mA/cm$^2$) at the time of application of a voltage of 0.5 V (vs. RHE) in data (oxygen reduction voltammogram) representing a relationship between the voltage and the current density obtained by performing sweep application of a potential through use of a rotating ring disk electrode device including a working electrode having the catalyst of the present invention applied thereto.

In this case, the current density $i_{0.5}$ exhibited by the catalyst of the present invention may be, for example, −1.0 (mA/cm$^2$) or less (e.g., from −1.0 (mA/cm$^2$) to −5.0 (mA/cm$^2$)), preferably −1.5 (mA/cm$^2$) or less (e.g., from −1.5 (mA/cm$^2$) to −5.0 (mA/cm$^2$)), particularly preferably −2.1 (mA/cm$^2$) or less (e.g., from −2.1 (mA/cm$^2$) to −5.0 (mA/cm$^2$)).

The catalyst of the present invention is obtained by carbonizing a raw material containing an organic substance, a metal, and a phosphorus compound. That is, the catalyst of the present invention is a carbonized product of the raw material containing the organic substance, the metal, and the phosphorus compound. The organic substance contained in the raw material is not particularly limited as long as the organic substance can be carbonized. Specifically, as the organic substance, for example, high-molecular-weight organic compounds (e.g., resins, such as a thermosetting resin and/or a thermoplastic resin), and/or low-molecular-weight organic compounds are used. In addition, a biomass may be used as the organic substance.

As the organic substance, a nitrogen-containing organic substance is preferably used. The nitrogen-containing organic substance is not particularly limited as long as the nitrogen-containing organic substance is an organic substance containing an organic compound that contains a nitrogen atom in a molecule thereof, and any one or more kinds thereof are used. The catalyst of the present invention obtained through use of the raw material containing the nitrogen-containing organic substance contains a nitrogen atom.

The content of the organic substance in the raw material is not particularly limited as long as the content falls within a range in which the catalyst of the present invention is obtained. The content may be, for example, 5 mass % or more and 90 mass % or less, preferably 10 mass % or more and 80 mass % or less.

It is preferred that the metal contained in the raw material (the metal contained in the catalyst of the present invention) be a transition metal. In this embodiment, the transition metal is a metal belonging to Groups III to XII in the periodic table, and one or more kinds of the transition metals belonging to the fourth period of Groups III to XII in the periodic table are preferably used.

Specifically, the transition metal may be, for example, one or more kinds selected from a group consisting of scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), ruthenium (Ru), rhodium (Rh), palladium (Pd), lanthanoids (cerium (Ce) and others), and actinoids. The transition metal may be preferably one or more kinds selected from a group consisting of Sc, Ti, V, Cr, Mn, Fe, Co, Ni, Cu, and Zn, or one or more kinds selected from a group consisting of Fe, Cu, and Zn.

As the metal contained in the raw material, a simple substance of the metal or a compound of the metal is used. As the metal compound, one or more kinds selected from a group consisting of, for example, a metal salt, a metal oxide, a metal hydroxide, a metal nitride, a metal sulfide, a metal carbide, and a metal complex may be used.

The content of the metal in the raw material is not particularly limited as long as the content falls within a range in which the catalyst of the present invention is obtained. The content may be, for example, 1 mass % or more and 90 mass % or less, preferably 2 mass % or more and 80 mass % or less.

Carbonization is performed by heating a raw material and keeping the raw material at a temperature at which the raw material is carbonized (hereinafter referred to as "carbonizing temperature"). The carbonizing temperature is not particularly limited as long as the raw material is carbonized. The carbonizing temperature may be, for example, 300° C. or more, 700° C. or more, or 900° C. or more. More specifically, the carbonizing temperature may be, for example, 300° C. or more and 3,000° C. or less, 700° C. or more and 2,000° C. or less, or 900° C. or more and 2,000° C. or less.

The temperature increase rate up to the carbonizing temperature is, for example, 0.5° C./min or more and 300° C./min or less. The period of time for keeping the raw material at the carbonizing temperature is, for example, 5 minutes or more and 24 hours or less. It is preferred that the carbonization be performed under the circulation of inert gas, such as nitrogen.

The catalyst of the present invention is a carbonized material obtained by the above-mentioned carbonization of a raw material. Specifically, the carbonized material obtained by the above-mentioned carbonization may be used directly as the catalyst of the present invention. In addition, the catalyst of the present invention may be obtained by subjecting the carbonized material obtained by the above-mentioned carbonization to further treatment. Specifically, the catalyst of the present invention may be obtained by, for example, subjecting the carbonized material to metal removal treatment (e.g., acid washing treatment or electrolytic treatment).

An electrode according to one embodiment of the present invention (hereinafter referred to as "electrode of the present invention") includes the catalyst of the present invention. Specifically, the electrode of the present invention is, for example, an electrode carrying the catalyst of the present invention. Specifically, the electrode of the present invention is, for example, an electrode including an electrode base material and the catalyst of the present invention carried on the electrode base material.

The electrode of the present invention is, for example, an electrode for a battery. Specifically, the electrode of the present invention is, for example, an electrode for a fuel cell or an electrode for an air cell. In addition, the electrode of the present invention is, for example, a cathode electrode or an anode electrode, preferably a cathode electrode.

A battery according to one embodiment of the present invention (hereinafter referred to as "battery of the present invention") includes the electrode of the present invention. Specifically, the battery of the present invention is, for example, a fuel cell or an air cell including the electrode of the present invention. The battery of the present invention may include, for example, a membrane/electrode assembly including the electrode of the present invention. The battery of the present invention is a battery including the electrode of the present invention as one or both of the cathode electrode and the anode electrode, preferably a battery including the electrode of the present invention as the cathode electrode.

Next, specific Examples according to the embodiments of the present invention will be described.

EXAMPLES

Example 1

1.0 g of folic acid, 0.29 g of iron(III) chloride hexahydrate ($FeCl_3.6H_2O$), and 1.0 g of phosphoric acid were mixed to prepare a raw material to be carbonized. Then, the raw material was placed in a quartz tube and heated at a temperature increase rate of 50° C./min in a nitrogen atmosphere in an image furnace and kept at 1,000° C. for 1 hour to be carbonized.

A carbonized material obtained by the carbonization was pulverized with a planetary ball mill (P-7, manufactured by Fritsch Japan Co., Ltd.) in which silicon nitride balls each having a diameter of 10 mm were set, and the resultant was sieved with a sieve of 106 µm. Further, a 1 M HCl aqueous solution was added to the resultant, and the mixture was stirred for 1 hour. After that, the carbonized material was collected by suction filtration and subjected to thermal vacuum drying at 80° C. Thus, a powdery carbon catalyst was obtained.

Example 2

A raw material to be carbonized was prepared through mixing in the same manner as in Example 1 except that 1.0 g of polyacrylonitrile was used in place of folic acid and 0.5 g of phosphoric acid was used. Then, the obtained mixture was heated in the atmosphere to be subjected to infusibilization. Specifically, the mixture was heated in the atmosphere so as to be increased in temperature from room temperature to 150° C. over 30 minutes and then increased in temperature from 150° C. to 220° C. over 2 hours. After that, the mixture was kept at 220° C. for 3 hours to be subjected to infusibilization. Thus, the raw material to be carbonized was prepared. Then, carbonization, pulverization, acid treatment, and drying were performed in the same manner as in Example 1. Thus, a carbon catalyst was obtained.

Example 3

A carbon catalyst was obtained in the same manner as in Example 1 except that 1.0 g of riboflavin was used in place of folic acid and 0.5 g of phosphoric acid was used.

Example 4

A carbon catalyst was obtained in the same manner as in Example 1 except that 0.2 g of copper(I) chloride (CuCl) was further used for a raw material to be carbonized.

Example 5

A carbon catalyst was obtained in the same manner as in Example 1 except that 0.3 g of zinc chloride ($ZnCl_2$) was further used for a raw material to be carbonized.

Example 6

1.0 g of riboflavin, 0.03 g of iron(III) chloride hexahydrate ($FeCl_3.6H_2O$), and 1.0 g of phosphoric acid were mixed to prepare a raw material to be carbonized. Then, the raw material was placed in a quartz tube and heated at a temperature increase rate of 50° C./min in a nitrogen atmosphere in an image furnace and kept at 700° C. for 1 hour to be carbonized.

Further, after pulverization and acid washing in the same manner as in Example 1, a carbonized material obtained by the carbonization at 700° C. was subjected to additional carbonization by being heated at a temperature increase rate of 50° C./min in a nitrogen atmosphere and kept at 1,000° C. for 1 hour. The carbonized material obtained by the carbonization at 1,000° C. was pulverized in the same manner as in Example 1. Thus, a powdery carbon catalyst was obtained.

Example 7

A carbon catalyst was obtained in the same manner as in Example 1 except that 0.5 g of phosphoric acid was used.

Example 8

A carbon catalyst was obtained in the same manner as in Example 6 except that 1.0 g of folic acid was used in place of riboflavin.

Example 9

A carbon catalyst was obtained in the same manner as in Example 2 except that 0.3 g of zinc chloride ($ZnCl_2$) was further used.

Comparative Example 1

A carbon catalyst was obtained in the same manner as in Example 1 except that 0.36 g of iron(II) sulfate heptahydrate ($FeSO_4.7H_2O$) was used in place of iron chloride, 1.0 g of a melamine resin was used in place of folic acid, and 0.1 g of triphenylphosphine was used in place of phosphoric acid.

Comparative Example 2

A carbon catalyst was obtained in the same manner as in Example 1 except that 0.03 g of iron(III) chloride hexahydrate ($FeCl_3.6H_2O$) was used, and carbonization was performed at 700° C. instead of 1,000° C.

X-Ray Photoelectron Spectroscopy

Each of the carbon catalysts obtained as described above was analyzed by X-ray photoelectron spectroscopy (XPS). That is, surface elements of the carbon catalyst were analyzed with an X-ray photoelectron spectrometer (Kratos AXISNOVA, manufactured by Shimadzu Corporation) (X-ray: AlKα X-ray, output: 10 mA×15 kV). Specifically, each surface element concentration (atomic %) of carbon atoms, nitrogen atoms, oxygen atoms, phosphorus atoms, and metal atoms was determined based on an area of each peak of a spectrum obtained by XPS measurement and a detection sensitivity coefficient, and a ratio (N/C) of the concentration (atomic %) of the nitrogen atoms with respect to the concentration (atomic %) of the carbon atoms on the surface, and a ratio (P/C) of the concentration (atomic %) of the phosphorus atoms with respect to the concentration (atomic %) of the carbon atoms on the surface were calculated as a ratio in concentration between the elements. A background at the time of quantitative calculation was determined by a Shirley method.

Then, through peak separation of a P2p peak in the obtained XPS spectrum, the P2p peak was separated into a peak $P_{130.0}$ having a peak top within a range of 130.0±0.3 eV and having a full width at half maximum of 2.0±0.5 eV, a peak $P_{132.5}$ having a peak top within a range of 132.5±0.3 eV and having a full width at half maximum of 2.0±0.5 eV, a peak $P_{133.2}$ having a peak top within a range of 133.2±0.3 eV and having a full width at half maximum of 2.0±0.5 eV, a peak $P_{133.9}$ having a peak top within a range of 133.9±0.3 eV and having a full width at half maximum of 2.0±0.5 eV, and a peak $P_{135.6}$ having a peak top within a range of 135.6±0.4 eV and having a full width at half maximum of 2.0±0.5 eV.

The peak separation was performed by superimposing overlapping peaks onto a Gaussian-Lorentzian basic waveform to approximate the overlapping peaks. In the spectrum subjected to energy value correction and intensity correction described later, a peak intensity, a peak full width at half maximum, and a peak position of a Gaussian-Lorentzian function, serving as each component, were optimized as parameters, and each of five overlapping peaks included in the above-mentioned peak was subjected to curve fitting, to thereby perform peak separation. The curve fitting was performed so that a residual sum of squares became smallest. The residual square refers to a square of a residual error at each measured energy value, and the residual sum of squares refers to a sum of residual squares. In addition, the residual error refers to a difference between the intensity of the P2p peak in the corrected spectrum and the sum of intensities of the five separated peaks.

First, the XPS spectrum obtained by the XPS measurement was subjected to energy value correction. In the energy value correction, measurement results of carbon atoms derived from C 1 s were used. When a normal value (284.5 eV in this case) of a peak top of a C 1 s peak is shifted from a peak top of a measured C 1 s peak, the measured value of the C 1 s peak is subtracted from the normal value, and the numerical value thus obtained is added to a binding energy value of the P2p peak. Then, intensity correction was performed. A background intensity was subtracted from an intensity of the spectrum obtained by the energy value correction, and a straight line connecting an intensity of a binding energy of 140 eV to an intensity of a binding energy of 125.9 eV was subtracted from each intensity, to thereby perform intensity correction. The peak separation was performed through use of the spectrum thus obtained.

A ratio of an area of the peak $P_{132.5}$ (peak having a peak top within a range of 132.5±0.3 eV) with respect to a total area of the five peaks obtained by the above-mentioned peak separation was calculated as a $P_{132.5}/P_{total}$ ratio.

Further, through multiplication of the ratio (P/C ratio) of the concentration (atomic %) of the phosphorus atoms with respect to the concentration (atomic %) of the carbon atoms by the above-mentioned $P_{132.5}/P_{total}$ ratio, the ratios being measured by the XPS, a ratio ($P_{132.5}$/C ratio) of the concentration (atomic %) of the phosphorus atoms exhibiting a $P_2$ peak with respect to the concentration (atomic %) of the carbon atoms was calculated.

Powder X-Ray Diffraction

A sample of the powdery carbon catalyst obtained as described above was placed in a concave portion (2 cm×2 cm×0.2 mm in thickness) of a glass sample plate and pressed with a slide glass so as to be uniformly filled into the concave portion so that the surface of the sample was matched with a reference surface. Then, the glass sample plate was fixed onto a wide-angle X-ray diffraction sample stage so that the filled sample was not deformed.

Then, X-ray diffraction (XRD) measurement was performed through use of an X-ray diffraction device (XRD-6100, manufactured by Shimadzu Corporation). The voltage and current applied to an X-ray tube were 40 kV and 30 mA, respectively. The sampling interval was 0.1°, the scanning speed was 1°/min, and the measurement angle range (2θ) was from 5° to 90°. As an incident X-ray, CuKα was used. The sample thickness was set to 0.2 mm, and the divergence slit width β was set to ⅔°.

Further, through the peak separation of the X-ray diffraction data obtained by the XRD measurement, the peak in the vicinity of the diffraction angle (2θ) of 26° (within a range of from 23° to 27°) was separated into two peaks $f_{broad}$ and $f_{narrow}$. The peak separation was performed by superimposing overlapping peaks onto a Gaussian basic waveform to approximate the overlapping peaks. In a diffraction pattern subjected to intensity correction and background correction described later, a peak intensity, a peak full width at half maximum, and a peak position of a Gaussian function, serving as each component, were optimized as parameters, and each of two overlapping peaks included in the above-mentioned peak was subjected to curve fitting, to thereby perform peak separation. The curve fitting was performed so that a residual sum of squares became smallest. The residual square refers to a square of a residual error at each measured diffraction angle, and the residual sum of squares refers to a sum of residual squares. In addition, the residual error refers to a difference between the intensity of the peak having a peak top in the vicinity of the diffraction angle (2θ) of 26° in the corrected X-ray diffraction pattern and the sum of intensities of the two separated peaks ($f_{broad}$ and $f_{narrow}$).

The intensity correction was performed by dividing the diffraction intensity at each diffraction angle by an intensity correction coefficient. The intensity correction coefficient is represented by a product of a polarization factor (P), a Lorentz factor (L), and a square of an atom scattering factor of carbon ($f_c$) as represented by the following expression: intensity correction coefficient=L×P×$f_c^2$.

The polarization factor (P) is represented by the following expression: P=(1+cos$^2$ 2 θ·cos$^2$ 2θ')/(1+cos$^2$ 2θ'). Here, θ represents an angle of a goniometer. θ' varies depending on a monochromatic procedure. θ' represents a diffraction angle of a monochromator crystal at a time when a counter monochromator is used. θ is 13.28° in the case where a graphite monochromator is used. θ is 0° at a time when the counter monochromator is not used (at a time when a Ni filter is used). In this Example, a graphite monochromator was used.

The Lorentz factor (L) is represented by the following expression: L=1/(sin$^2$ θ·cos θ). In addition, the atom scattering factor of carbon ($f_c$) is represented by the following expression: $f_c$=2.26069 exp(−0.226907 s$^2$)+1.56165 exp (−0.00656665 s$^2$)+1.05075 exp(−0.0975618 s$^2$)+0.839259 exp(−0.5555949 s$^2$)+0.286977. Here, s is represented by the following expression: s=sin θ/λ. λ represents a wavelength of a characteristic X-ray used for obtaining X-ray diffraction data, and in this case, is a wavelength λ of 0.1541838 nm of CuKα. In addition, calculation was performed with units of θ in the above-mentioned calculation expression being radians.

The background correction was performed by defining a straight line connecting the vicinity of a diffraction angle (2θ) of from 10° to 20° to the vicinity of a diffraction angle (2θ) of from 30° to 40° as a background, and subtracting the background from each diffraction intensity after the intensity correction. A ratio of each component was calculated based on an area of each peak obtained by the above-mentioned peak separation.

Oxygen Reduction Activity

The oxygen reduction activity of the carbon catalyst obtained as described above was evaluated. First, a catalyst slurry containing the carbon catalyst was prepared. Specifically, 50 μL of a 5 wt % commercially available Nafion (trademark) solution (produced by Sigma-Aldrich), 150 μL of ethanol, and 150 μL of distilled water were added to 5 mg of the carbon catalyst, and glass beads were added thereto. Then, the resultant was subjected to ultrasonic treatment for 10 minutes, to thereby provide a homogeneous catalyst slurry.

Then, the catalyst slurry was pipetted, and 1.78 μL thereof was applied to a disk electrode (diameter: 4 mm) of a rotating ring disk electrode device (RRDE-3A, Ver. 1.2, manufactured by BAS Inc.), followed by drying, to thereby manufacture a working electrode. A platinum electrode was used as a counter electrode, and a reversible hydrogen electrode was used as a reference electrode. A 0.5 M sulfuric acid aqueous solution saturated with oxygen was used as an electrolyte solution.

Then, a current density obtained by rotating the electrode at a rotation speed of 1,500 rpm and sweeping a potential at a sweep speed of 0.1 mV/sec was recorded as a function of a potential. From the oxygen reduction voltammogram thus obtained, a current density $i_{0.5}$ (mA/cm$^2$) at a time when a voltage of 0.5 V (vs. RHE) was applied was recorded.

Performance Retention Ratio

The retention ratio of the oxygen reduction activity (performance retention ratio) of the carbon catalyst obtained as described above was evaluated. That is, each of the carbon catalysts obtained in Examples 1 to 9 and Comparative Examples 1 and 2 was subjected to a start-stop test involving repeatedly applying a voltage. First, a catalyst slurry containing the carbon catalyst was prepared. Specifically, 50 μL of a 5 wt % Nafion (trademark) solution (produced by Sigma-Aldrich), 150 μL of ethanol, and 150 μL of distilled water were added to 5 mg of the carbon catalyst, and glass beads were added thereto. Then, the resultant was subjected to ultrasonic treatment for 10 minutes, to thereby provide a homogeneous catalyst slurry.

Then, 1.78 μL of the catalyst slurry was pipetted and applied to a disk electrode (diameter: 4 mm) of a rotating ring disk electrode device (RRDE-3A, Ver. 1.2, manufactured by BAS Inc.), followed by drying, to thereby manufacture a working electrode. A 0.5 M sulfuric acid aqueous solution saturated with oxygen at normal temperature was used as an electrolyte solution. In addition, a reversible hydrogen electrode was used as a reference electrode. Then, a current density obtained by rotating the electrode at a rotation speed of 1,500 rpm and sweeping a potential at a sweep speed of 0.1 mV/sec was recorded as a function of a potential. From the oxygen reduction voltammogram thus obtained, a potential at which a current having a half current density of that at a time of 0 V (vs. RHE) flowed was recorded. The potential thus obtained was defined as a potential before the start-stop test.

Next, the electrolyte solution was replaced by an electrolyte solution obtained by saturating a 0.5 M sulfuric acid aqueous solution with nitrogen at normal temperature, and 500 cycles of the start-stop test were performed through use of a triangular wave at a voltage of from 1.0 V to 1.5 V and a sweep speed of 0.5 mV/sec. Then, a current density was measured under the same conditions as those before the start-stop test, and a ratio of a potential measured after the start-stop test with respect to the potential measured before the start-stop test was determined as a performance retention ratio (%). As the performance retention ratio is higher, the durability of the carbon catalyst is more excellent.

Results

Figure 1:
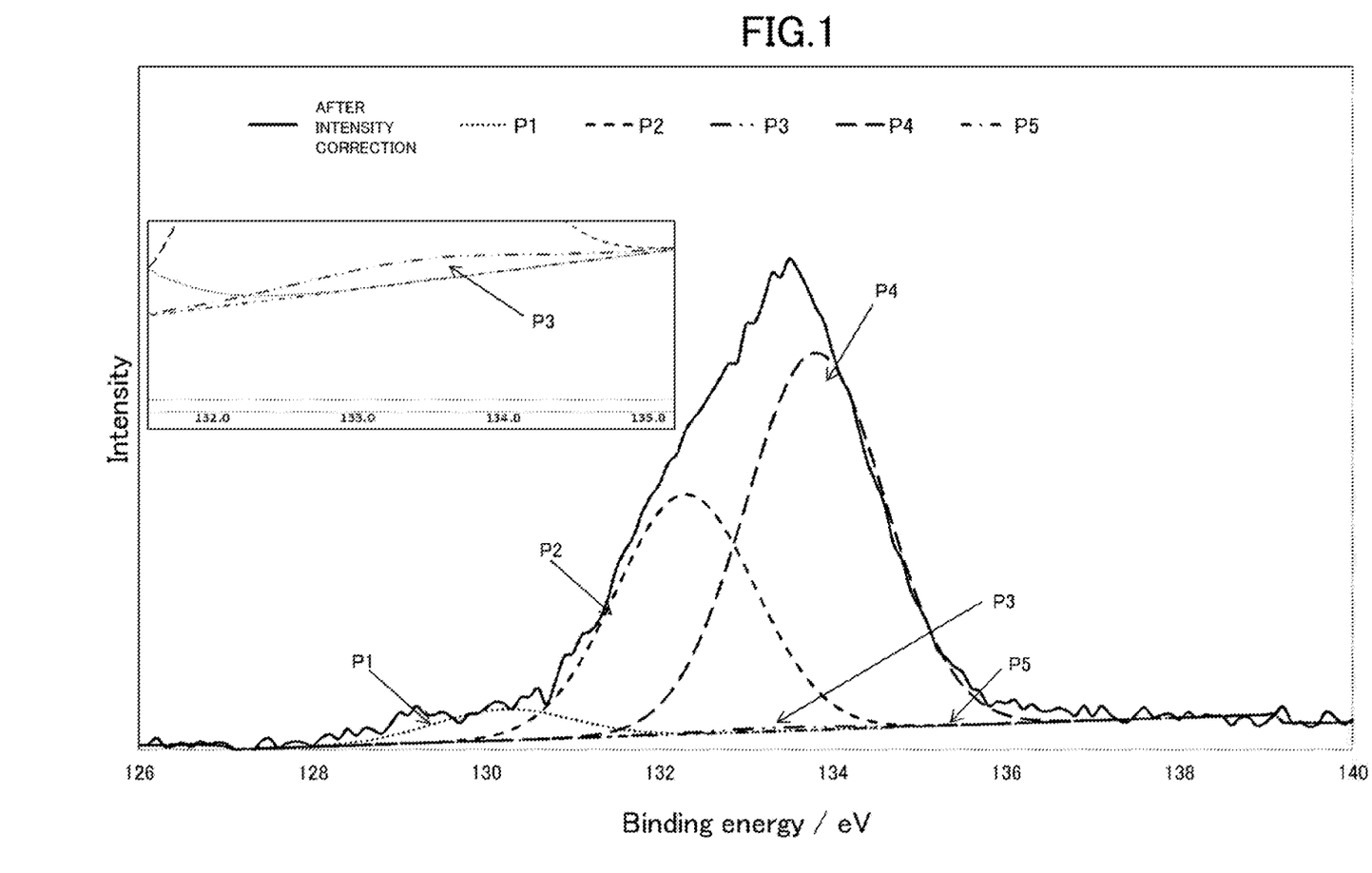
FIG. 1 is an explanatory diagram for showing an example of results obtained by performing peak separation of a phosphorus atom P2p peak by X-ray photoelectron spectroscopy in a carbon catalyst produced in Examples according to one embodiment of the present invention.

In FIG. 1, the results obtained by performing the peak separation of the P2p peak in the XPS spectrum of the carbon catalyst obtained in Example 1 are shown. In FIG. 1, "P1" represents the peak $P_{130.0}$, "P2" represents the peak $P_{132.5}$, "P3" represents the peak $P_{133.2}$, "P4" represents the peak $P_{133.9}$, and "P5" represents the peak $P_{135.6}$. Since the peak intensity of the "P3" was small, an enlarged diagram of the "P3" is also shown in FIG. 1. In addition, the peak intensity of the "P5" was so small that the peak was not visually recognized in FIG. 1.

Figure 2A:
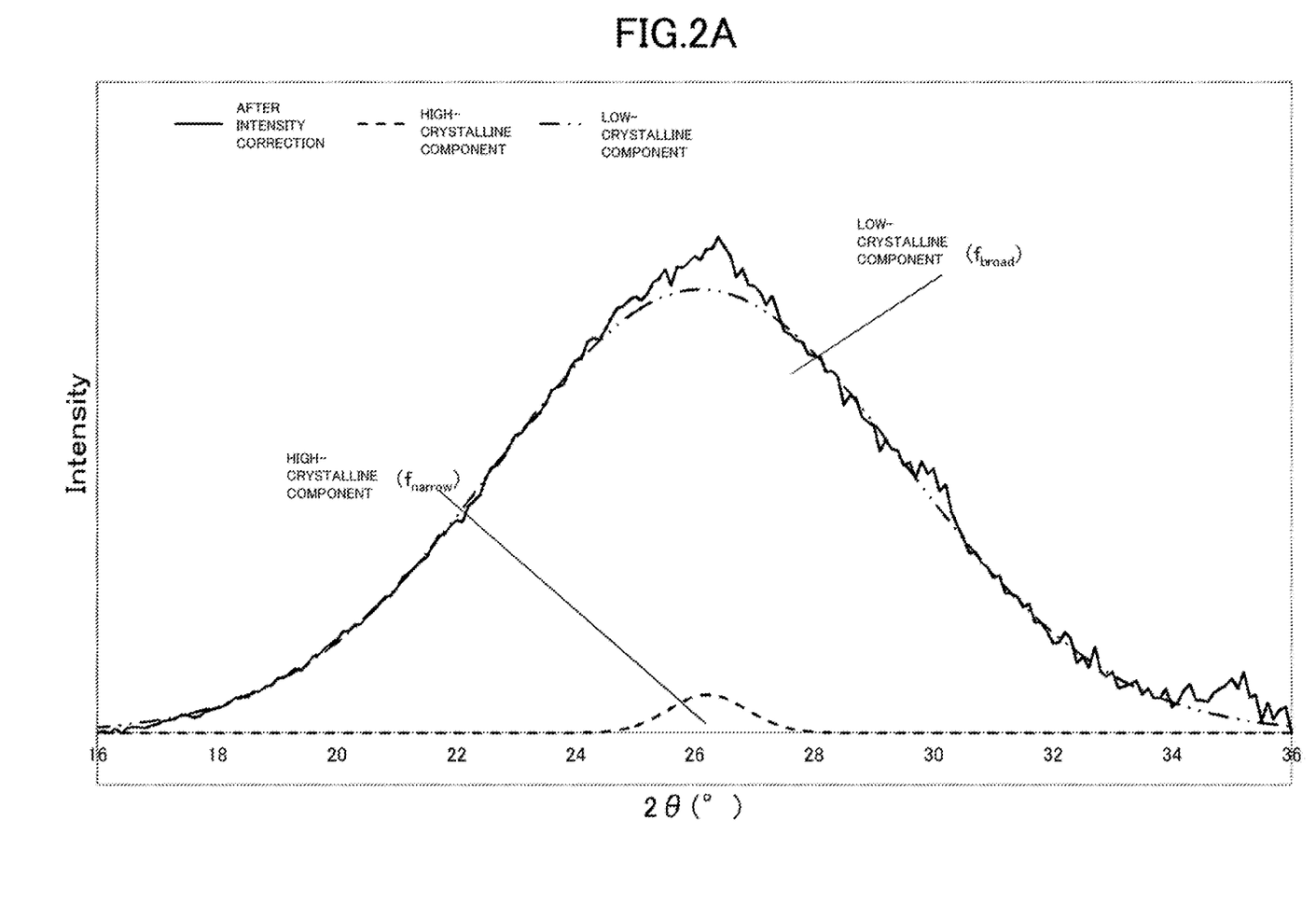
FIG. 2A is an explanatory diagram for showing an example of results obtained by performing peak separation in an X-ray diffraction pattern obtained by powder X-ray diffraction in the carbon catalyst produced in Examples according to one embodiment of the present invention.
Figure 2B:
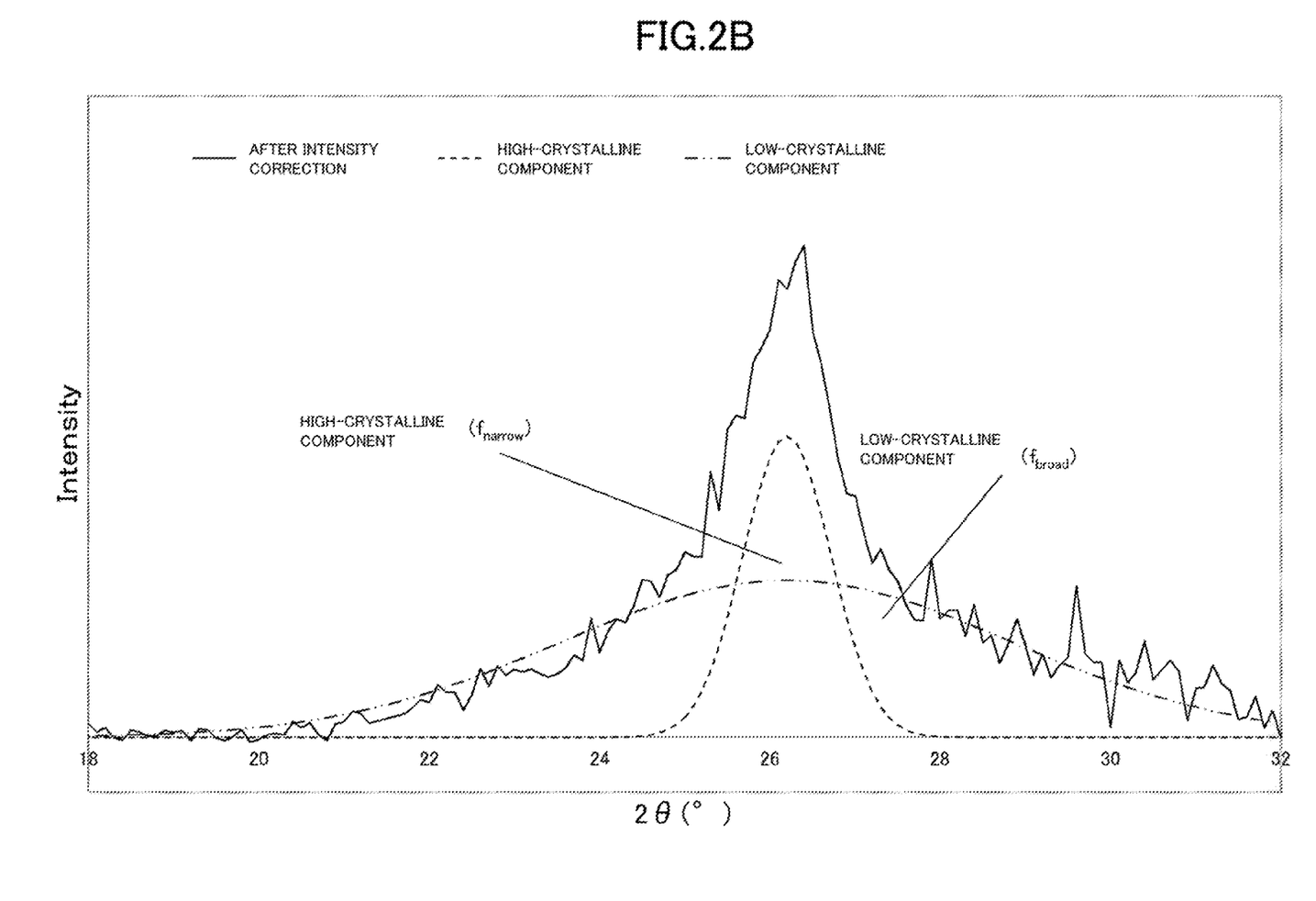
FIG. 2B is an explanatory diagram for showing another example of results obtained by performing peak separation in an X-ray diffraction pattern obtained by powder X-ray diffraction in a carbon catalyst produced in Examples according to one embodiment of the present invention.
Figure 3:
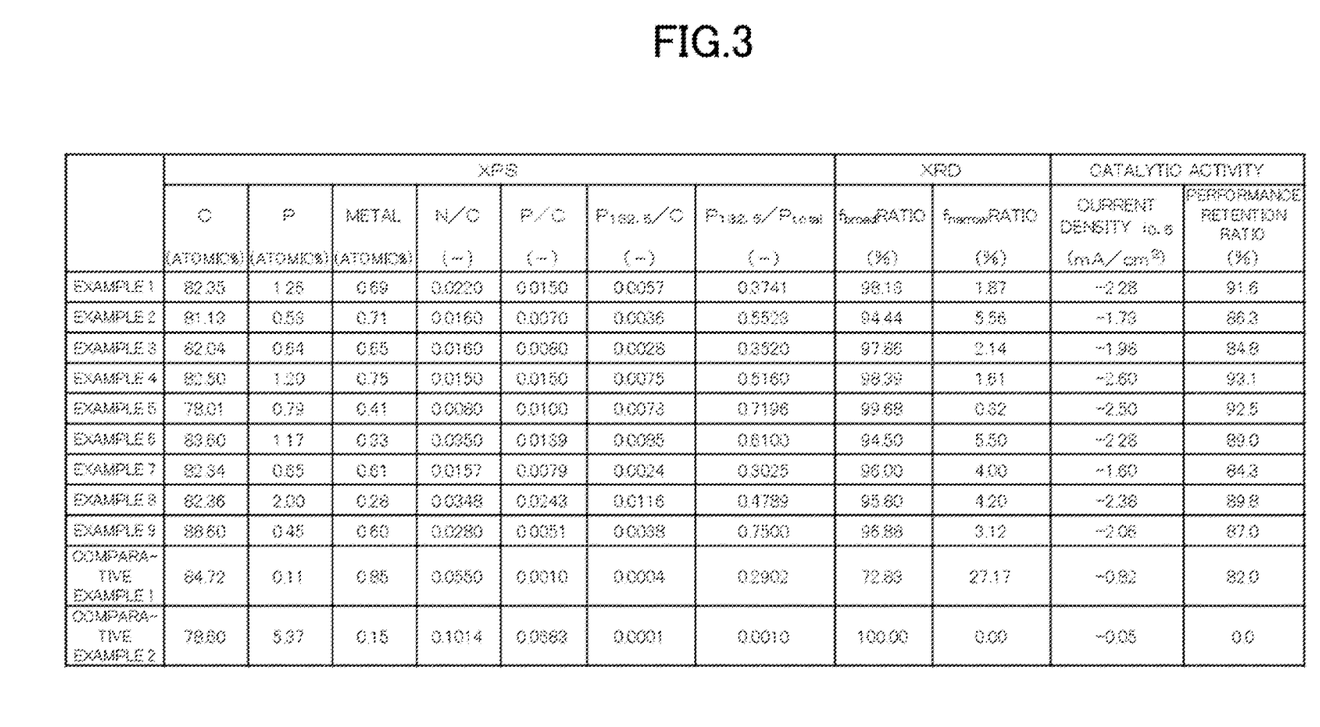
FIG. 3 is an explanatory diagram for showing results obtained by evaluating carbon catalysts produced in Examples according to embodiments of the present invention.

In FIG. 2A, the results obtained by performing the peak separation in the XRD diffraction pattern of the carbon catalyst obtained in Example 1 are shown. In FIG. 2B, the results obtained by performing the peak separation in the XRD diffraction pattern of the carbon catalyst obtained in Comparative Example 1 are shown. In FIG. 3, the results of the XPS measurement, the results of the XRD measurement, and the results of the oxygen reduction activity measurement in each of Examples 1 to 9 and Comparative Examples 1 and 2 are shown.

As shown in FIG. 3, the current density $i_{0.5}$ (mA/cm$^2$) of the carbon catalyst obtained in each of Examples 1 to 9 was significantly larger than that of the carbon catalyst obtained in each of Comparative Examples 1 and 2. That is, the oxygen reduction activity of the carbon catalyst obtained in each of Examples 1 to 9 was significantly higher than that of the carbon catalyst obtained in each of Comparative Examples 1 and 2.

In addition, the performance retention ratio (%) of the carbon catalyst obtained in each of Examples 1 to 9 was significantly larger than that of the carbon catalyst obtained in each of Comparative Examples 1 and 2. That is, the carbon catalyst obtained in each of Examples 1 to 9 was also more excellent from the viewpoint of durability than the carbon catalyst obtained in each of Comparative Examples 1 and 2.

Further, as shown in FIG. 3, the $P_{132.5}/C$ ratio of the carbon catalyst obtained in each of Examples 1 to 9 was significantly larger than that of the carbon catalyst obtained in each of Comparative Examples 1 and 2. Thus, it was considered that the carbon catalyst obtained in each of Examples 1 to 9 exhibited excellent oxygen reduction activity and durability by containing a relatively large amount of the particular phosphorus atoms that exhibited the peak $P_{132.5}$ having a peak top within a range of 132.5±0.3 eV in the XPS measurement (that is, due to the relatively large $P_2/C$ ratio).

Further, in the carbon catalyst obtained in each of Examples 1 to 9, the $P_{132.5}/P_{total}$ ratio was 0.3025 or more, which was larger than that of the carbon catalyst obtained in each of Comparative Examples 1 and 2. In addition, as shown in FIG. 3, in the carbon catalyst obtained in each of Examples 1 to 9, the ratio of the peak $f_{broad}$ derived from a low-crystalline component was more than 72.83% (more specifically, 94.44% or more), and the ratio of the peak $f_{narrow}$ derived from a high-crystalline component was less than 27.17% (more specifically, 5.56% or less) in the XRD measurement.

In addition, in the carbon catalyst obtained in each of Examples 1, 4, 5, 6, and 8, the current density $i_{0.5}$ and the performance retention ratio were particularly excellent compared to those of the carbon catalyst obtained in each of Examples 2, 3, 7, and 9. In this respect, the $P_{132.5}/C$ ratio of the carbon catalyst obtained in each of Examples 1, 4, 5, 6, and 8 was more than 0.0038 (more specifically, 0.0057 or more), which was larger than that of the carbon catalyst obtained in each of Examples 2, 3, 7, and 9.

In addition, the P/C ratio of the carbon catalyst obtained in each of Examples 1, 4, 5, 6, and 8 was more than 0.0080 (more specifically, 0.0100 or more), which was larger than that of the carbon catalyst obtained in Examples 2, 3, 7 and 9. Furthermore, the amount (atomic %) of the phosphorus atoms of the carbon catalyst obtained in each of Examples 1, 4, 5, 6, and 8 was more than 0.65 (more specifically, 0.79 or more), which was larger than that of the carbon catalyst obtained in each of Examples 2, 3, 7, and 9.

The invention claimed is:

1. A carbon catalyst, comprising a metal and phosphorus atoms,
   wherein the carbon catalyst has a ratio of a concentration (atomic %) of the phosphorus atoms with respect to a concentration (atomic %) of carbon atoms in X-ray photoelectron spectroscopic measurement of 0.0005 or more, the phosphorus atoms exhibiting a peak having a peak top within a range of 132.5±0.3 eV and having a full width at half maximum of 2.0±0.5 eV, which is obtained by peak separation of a phosphorus atom P2p peak, and
   wherein the carbon catalyst has a carbon structure in which area ratios (%) of the following two peaks $f_{broad}$ and $f_{narrow}$ obtained by separating a peak in a vicinity of a diffraction angle (2θ) of 26° in an X-ray diffraction pattern in powder X-ray diffraction measurement satisfy the following conditions (a) and (b):
   (a) a peak $f_{broad}$ having a peak top within a range of a diffraction angle (2θ) of 23.5°±3.5° and having a full width at half maximum of 10.0°±5.0°: 73.0% or more and less than 100.0%;
   (b) a peak $f_{narrow}$ having a peak top within a range of a diffraction angle (2θ) of 26.5°±1.0° and having a full width at half maximum of 3.5°±3.0°: more than 0.0% and 27.0% or less; and
   wherein the carbon catalyst has a maximum phosphorus concentration of 2.0 atomic %.

2. The carbon catalyst according to claim 1,
   wherein the carbon catalyst has a ratio of an area of the following peak (2) with respect to a total area of the following five peaks (1) to (5) in the X-ray photoelectron spectroscopic measurement of 0.3000 or more, the five peaks being obtained by the peak separation of the phosphorus atom P2p peak:
   (1) a peak having a peak top within a range of 130.0±0.3 eV and having a full width at half maximum of 2.0±0.5 eV;
   (2) the peak having a peak top within a range of 132.5±0.3 eV and having a full width at half maximum of 2.0±0.5 eV;
   (3) a peak having a peak top within a range of 133.2±0.3 eV and having a full width at half maximum of 2.0±0.5 eV;
   (4) a peak having a peak top within a range of 133.9±0.3 eV and having a full width at half maximum of 2.0±0.5 eV; and
   (5) a peak having a peak top within a range of 135.6±0.4 eV and having a full width at half maximum of 2.0±0.5 eV.

3. An electrode, comprising the carbon catalyst of claim 1.

4. A battery, comprising the electrode of claim 3.

5. An electrode, comprising the carbon catalyst of claim 2.

6. A battery, comprising the electrode of claim 5.

7. The carbon catalyst according to claim 1,
   wherein (a) $f_{broad}$: 75.0% or more and 99.9% or less; and
   (b) $f_{narrow}$: 0.1% or more and 25.0% or less.

8. The carbon catalyst according to claim 1,
   wherein (a) $f_{broad}$: 80.0% or more and 99.9% or less; and
   (b) $f_{narrow}$: 0.1% or more and 20.0% or less.

9. The carbon catalyst according to claim 1,
   wherein (a) $f_{broad}$: 85.0% or more and 99.9% or less; and
   (b) $f_{narrow}$: 0.1% or more and 15.0% or less.

10. The carbon catalyst according to claim 1,
    wherein (a) $f_{broad}$: 90.0% or more and 99.9% or less; and
    (b) $f_{narrow}$: 0.1% or more and 10.0% or less.

* * * * *